M. R. MUELLER.
TRUCK.
APPLICATION FILED JUNE 14, 1917.
1,242,223.
Patented Oct. 9, 1917.
3 SHEETS—SHEET 3.
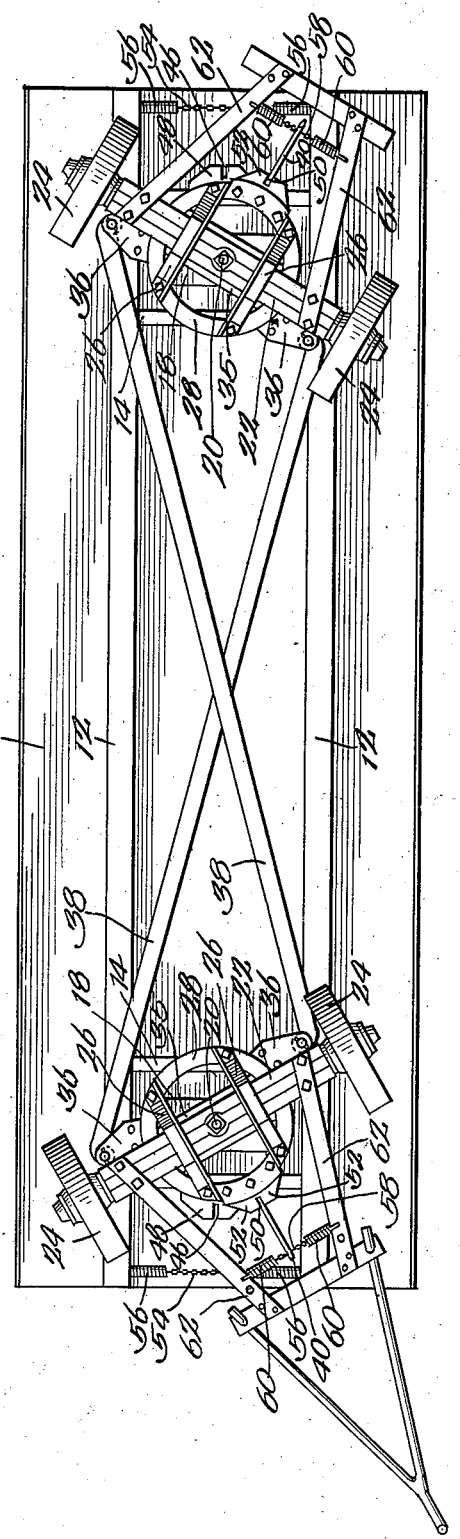
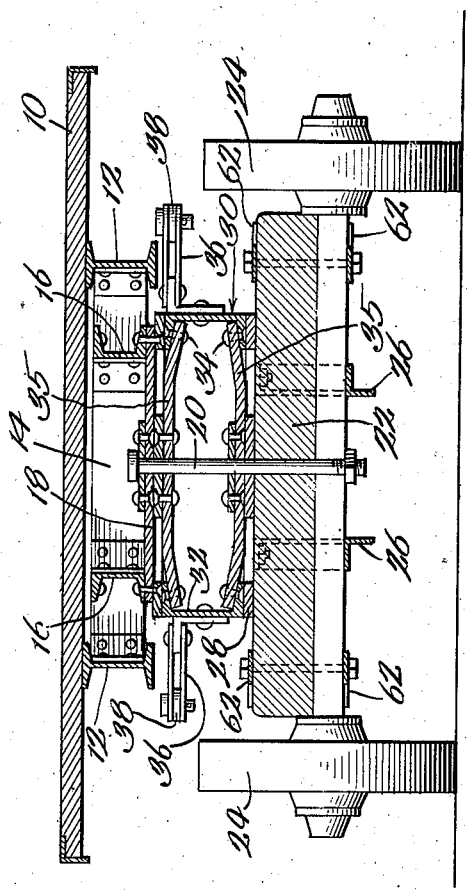
Inventor:
Milton R. Mueller.
By Cheever & Cox
Attys.

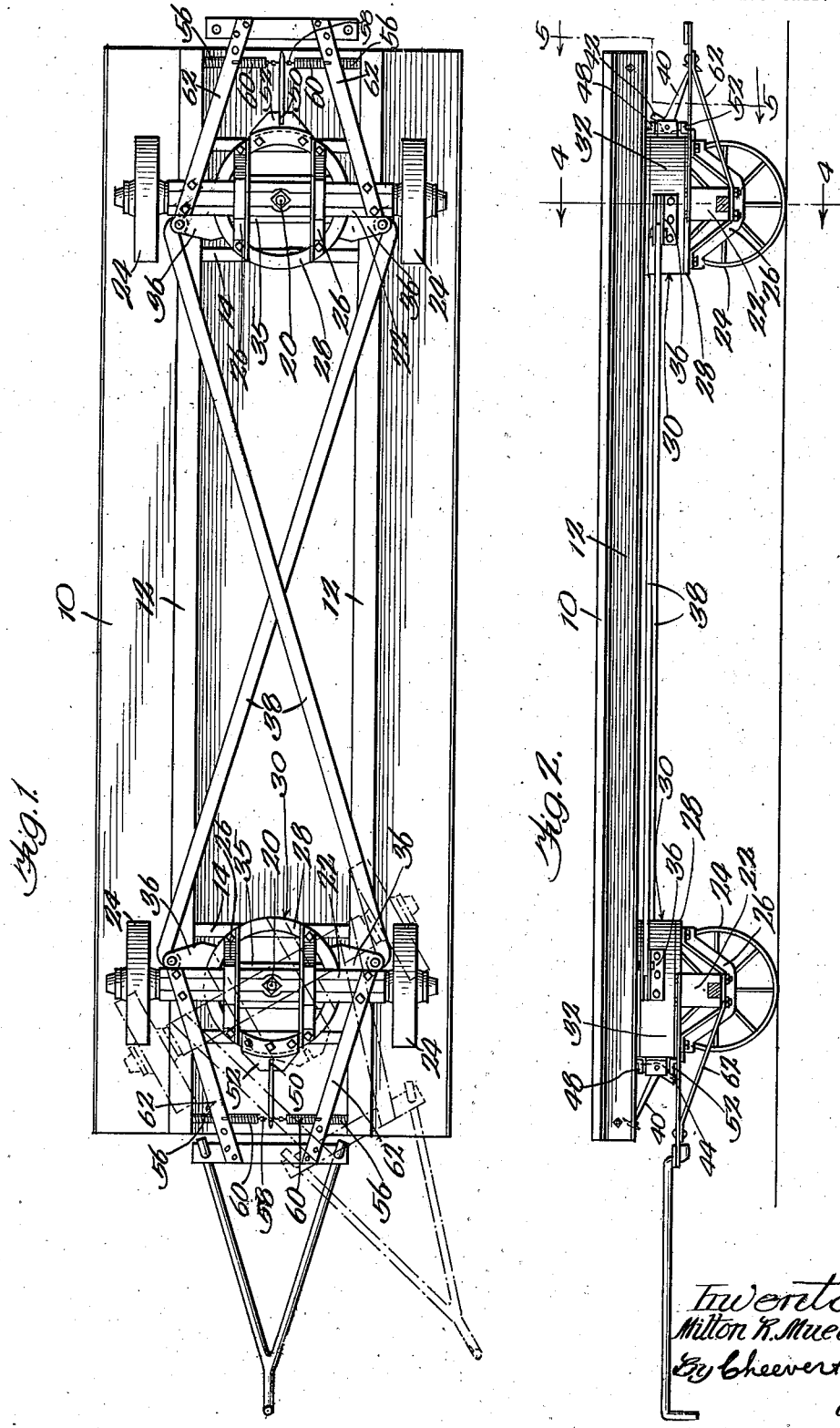

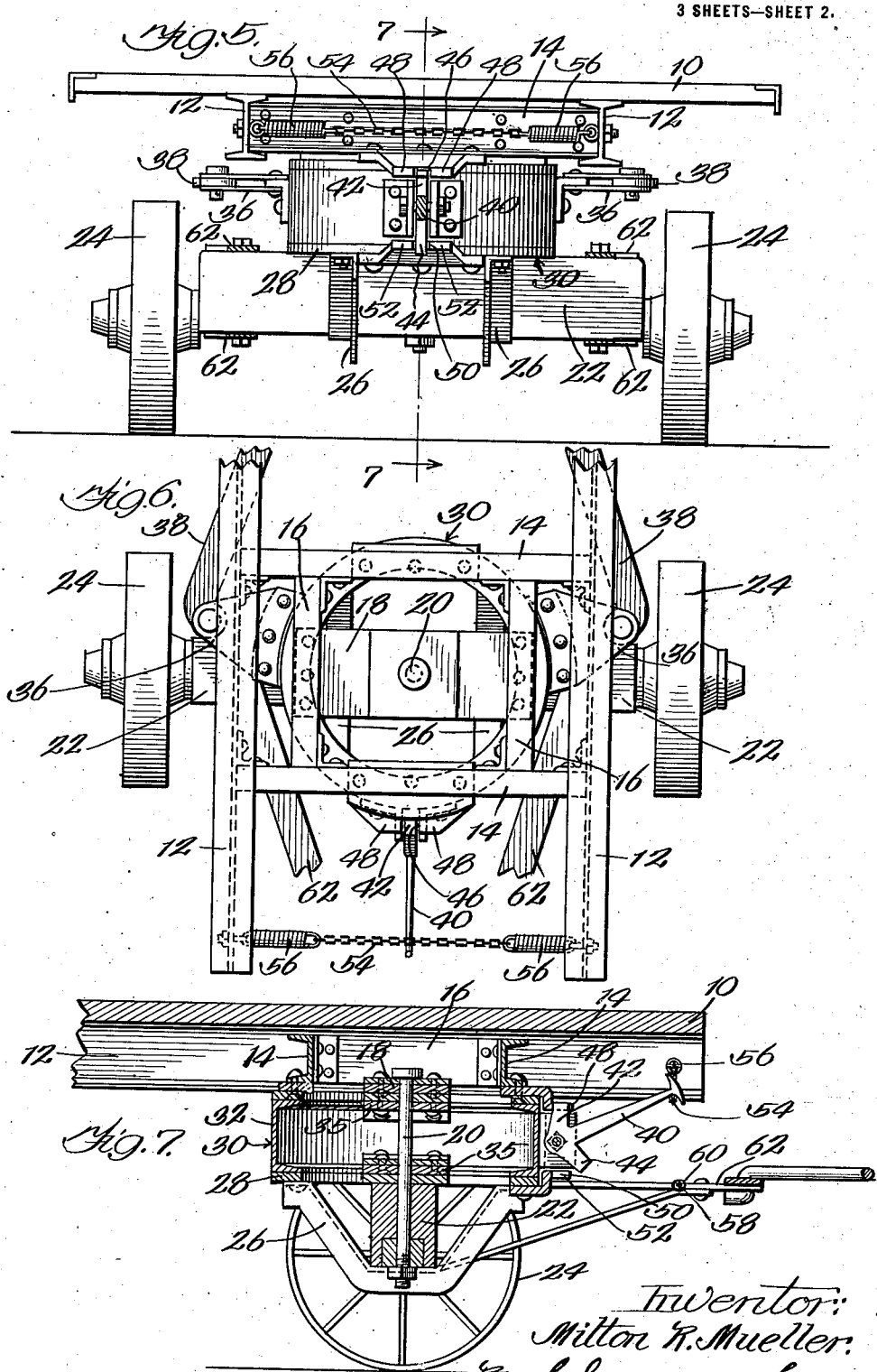

UNITED STATES PATENT OFFICE.

MILTON R. MUELLER, OF QUINCY, ILLINOIS, ASSIGNOR TO ELECTRIC WHEEL COMPANY, OF QUINCY, ILLINOIS, A CORPORATION OF ILLINOIS.

TRUCK.

1,242,223.  Specification of Letters Patent.  Patented Oct. 9, 1917.

Application filed June 14, 1917. Serial No. 174,790.

*To all whom it may concern:*

Be it known that I, MILTON R. MUELLER, a citizen of the United States, residing at Quincy, in the county of Adams and State of Illinois, have invented a certain new and useful Improvement in Trucks, of which the following is a specification.

This invention relates to vehicles. The object to the invention is to provide wagons and the like with front and rear fifth wheel structures which may be instantly converted, at the will of the operator, from single fifth wheel action to double fifth wheel action.

The invention consists in means for carrying out the foregoing general objects; which can be easily and cheaply made; which is efficient in operation, and is not readily liable to get out of order. The invention consists more particularly in the special features and details of construction hereafter more fully set forth in the specification and claims.

Referring to the drawings, in which similar numerals refer to the same parts throughout the several views—

Figure 1 is an inverted view of a wagon or truck equipped with mechanism illustrating this invention in its preferred form, the same showing, in full line, the parts in normal position when the vehicle is being drawn straight ahead, and showing, in dotted lines, the position of the front wheels when only single fifth wheel action is employed at the front or left hand end of the device.

Fig. 2 is a side view of the mechanism illustrated in full lines of Fig. 1.

Fig. 3 is a changed position view of the parts of Fig. 1, showing the extreme turning position assumed when the double fifth wheel action of the device is in full use.

Fig. 4 is an end sectional view on the line 4—4 of Fig. 2.

Fig. 5 is a sectional view on the irregular line 5—5 of Fig. 2.

Fig. 6 is a plan view of the fifth wheel mechanism, the body or wagon of the truck being removed.

Fig. 7 is a sectional detail view through the line 7—7 of Fig. 6.

In the specific embodiment of the invention shown in the drawings, the device is applied to a heavy load carrying truck having a load platform or body 10, but obviously the mechanism may be applied to numerous other types of vehicles. In the particular construction shown in the drawings, the load platform 10 is supported rigidly upon longitudinal I-beam girders 12 spaced apart at suitable intervals by rigid channel-iron cross members 14 in the ordinary manner. At the front and rear portions of the truck body certain pairs of these cross members 14 are rigidly connected together by intermediate channel-irons 16, to whose under sides are respectively secured front and rear upper fifth wheel bearing plates 18.

Pivotally supported through the centers of these upper fifth wheel bearing plates are vertical bolts 20, each pivotally engaging a bolster 22 on which the traction wheels 24 are respectively mounted in pairs in the obvious manner shown in the drawings. Rigidly supported upon the tops of the bolsters 22, partly through the agency of suitable brackets 26, are circular rings 28, hereafter respectively referred to as front and rear lower fifth wheels.

Rotatably mounted upon each vertical bolt 20 and between its adjacent and upper and lower fifth wheels, just referred to, and slidably bearing on each, is a rotatable drum member or wheel 30 made up, in the particular construction shown, of a circular channel-iron 32, secured by bolts or rivets 34 to the top and bottom plates of the drum.

Rigidly secured to outer opposite sides of each drum, just referred to, are brackets 36 to whose outer ends are pivotally attached connecting rods 38, preferably crossed, as shown in the drawings, in the manner well known in the art, so that the rotation of either drum 30 will, through the agency of these rods 38, rotate the other drum 30 in an equal amount and in the opposite direction.

The structure is such that in the absence of other mechanism than that thus far described, the drums 30 can be rotated freely with reference to either or both of their fifth wheels 18 and 28. It is, therefore, necessary, in order to accomplish the purposes of this invention, to provide means for selectively locking each drum 30 to one of its fifth wheels, leaving the drum free to rotate on its other fifth wheel. Various forms of locking mechanism may be provided without departing from this invention. The particular device shown in the drawings for this purpose comprises, in connection with each drum, a locking lever 40, carrying a pair of oppositely disposed pawls 42 and 44, so arranged that when lever 40 is in the position of Fig. 7, upper pawl 42 slips into a slot 46 formed between two projecting lugs 48 rigidly attached, by any suitable means, to the upper fifth wheel or to the truck body or both, thus locking the drum and the truck body together, while the lower fifth wheel 28 is free to rotate on the under side of the drum; and that the lower pawl 44 is adapted, when the lever 40 is swung to the position shown at the right hand end of Fig. 4, to pass into a slot 50 between lugs 52 rigidly connected, by any suitable means, to the lower fifth wheel thereby, in this position, locking the drum to the lower fifth wheel and leaving the upper fifth wheel free for movement about the drum. In the particular embodiment shown in the drawings, each lever 40 is detachably held in upper position by being hooked over a chain 54 normally held tight by retractile springs 56 attached to the I-beams 12, above referred to, while said lever 40 is detachably held in lowered position by being hooked under a chain 58 held tight by retractile springs 60, interposed between two horizontally extending draft members 62 (see Fig. 3), extending forwardly and rearwardly from the respective bolsters.

It is obvious on examining the structure shown and described that: when the parts are in the position shown in Fig. 2, with the forward lever 40 locked in raised position, while the rear lever 40 is locked in lowered position, that the forward wheels at the left of Figs. 1 and 2 are free to rotate with reference to the forward lower fifth wheel backward and forward between the full line and dotted line position of Fig. 1 without in any way affecting the forward drum or any mechanism connected therewith; that as the forward drum is locked to its upper fifth wheel and is consequently rigid with the body 10, and the rear drum is rigidly connected to the forward drum through the rods 38, the rear wheels are held against rotation on either of its fifth wheels with the result that the device operates as an ordinary truck, with only the front wheels turnable upon their fifth wheel.

By simply removing forward lever 40 from the raised position shown in Fig. 2 to depressed position, thereby releasing the forward drum from the forward upper fifth wheel and rigidly connecting the forward drum to the forward lower fifth wheel, the forward wheels are rigidly connected to the forward drum, and both sets of wheels, forward and rear, can rotate in unison in horizontal planes about their upper fifth wheels between the full line position of Fig. 1 and the full line position of Fig. 3, and vice versa.

If for any reason it is desired to run the truck shown backward, the rear wheels can be rendered turnable about their fifth wheel and the front wheels can be locked against such turning by simply raising lever 40 at the right of Fig. 2 and depressing lever 40 at the left, locking each in its new position.

Having thus described my invention, what I claim as new and desire to secure by Letters Patent, is:

1. In a device of the class described, in combination with a vehicle body, supporting wheel devices at opposite ends thereof, fifth wheels carried by the supporting wheel devices at each end of the vehicle, corresponding fifth wheels carried by each end of the vehicle, a horizontally rotatable member between the fifth wheels at each end, connecting devices between the two horizontally rotatable members adapted to cause them to move in unison, and means for selectively locking each one of said horizontally rotatable members to either fifth wheel adjacent to it for the purposes set forth.

2. In a device of the class described, in combination with a vehicle body, supporting wheel devices at opposite ends thereof, fifth wheels carried by the supporting wheel devices at each end of the vehicle, corresponding fifth wheels carried by each end of the vehicle, a horizontally rotatable member between the fifth wheels at each end, connecting devices between the two horizontally rotatable members adapted to cause them to move in unison, and means for selectively locking each one of said horizontal rotatable members to either fifth wheel adjacent to it and to the adjacent part of the vehicle, for the purposes set forth.

3. In a device of the class described, in combination with a vehicle body and supporting wheel devices at each end thereof, a pair of oppositely placed fifth wheels located at each end of the vehicle, one attached to the vehicle body, the other to the wheel supporting device, mechanism mounted between the fifth wheels at each end of the vehicle operatively connected together, and mechanism for selectively connecting any two of the fifth wheels at opposite ends of the vehicle to said connecting mechanism, for the purposes set forth.

4. In a device of the class described, in combination with a vehicle body and supporting wheel devices at each end thereof, a pair of oppositely placed fifth wheels located at each end of the vehicle, one attached to the vehicle body, the other to the wheel supporting device, mechanism mounted between the fifth wheels at each end of the vehicle operatively connected together, and mechanism for selectively connecting any two of the fifth wheels at opposite ends of the vehicle to said connecting mechanism and to the adjacent part of the vehicle, for the purposes set forth.

5. In a device of the class described, in combination with a vehicle body and a supporting wheel device supporting a portion thereof, a pair of oppositely positioned fifth wheels, one located on the vehicle body, the other on the wheel supporting device, an intermediate member rotatable between the fifth wheels, and means for selectively locking either one of said fifth wheels to the intermediate member, for the purposes set forth.

6. In a device of the class described, in combination with a vehicle body and a supporting wheel device supporting a portion thereof, a pair of oppositely positioned fifth wheels, one located on the vehicle body, the other on the wheel supporting device, an intermediate member rotatable between the fifth wheels, and means for selectively locking either one of said fifth wheels to the intermediate member and to the adjacent part of the vehicle, for the purposes set forth.

7. In a device of the class described, in combination with a vehicle body and a supporting wheel device supporting a portion thereof, a pair of oppositely positioned fifth wheels, one located on the vehicle body, the other on the wheel supporting device, an intermediate member rotatable between the fifth wheels, and means for selectively locking either one of said fifth wheels to the intermediate member, the locking mechanism being so constructed that only one of said fifth wheels at a time can be located with the intermediate member, for the purposes set forth.

8. In a device of the class described, in combination with a vehicle body, a pair of bolsters each supplied with supporting wheels located at each end of the vehicle body, a horizontally disposed circular fifth wheel mounted on each bolster, a correspondingly disposed fifth wheel mounted on the bottom of the vehicle body over each bolster, pivotal connections between the vehicle body and the bolsters through said fifth wheels, and an intermediate wheel pivoted upon each of said pivotal connection between each pair of fifth wheels, connecting rods between the intermediate rotatable member at each end of the device, and mechanism for selectively locking either one of the fifth wheels at either end of the vehicle to the intermediate member and to the adjacent part of the vehicle, for the purposes set forth.

9. In a device of the class described, in combination with a vehicle body and supporting wheels and wheel bolsters on opposite ends thereof, fifth wheels on the bolsters and on the vehicle body facing each other at opposite ends of the vehicle, an intermediate member between each pair of fifth wheels, means connecting said intermediate members together to cause them to move in unison, a latch lever pivotally supported by each of said intermediate members having oppositely extending pawls adapted to selectively engage notches in parts carried by a selected one of the fifth wheels, the devices being so arranged that only one pawl can be in engagement with its notch at a time, and means for securing the opposite ends of a given lever to a part carried by the frame of the machine when the intermediate member is locked to the upper fifth wheel and to a part carried by and movable with the adjacent bolster when the lever is moved to such a position that the intermediate member is locked to the fifth wheel carried by the bolster, for the purposes set forth.

In witness whereof, I have hereunto subscribed my name in the presence of two witnesses.

MILTON R. MUELLER.

Witnesses:
G. A. TIPTON,
W. W. SHERMAN.